H. MILLEMAN.
RAKE AND HOE.
APPLICATION FILED AUG. 25, 1913.
1,105,815.
Patented Aug. 4, 1914.
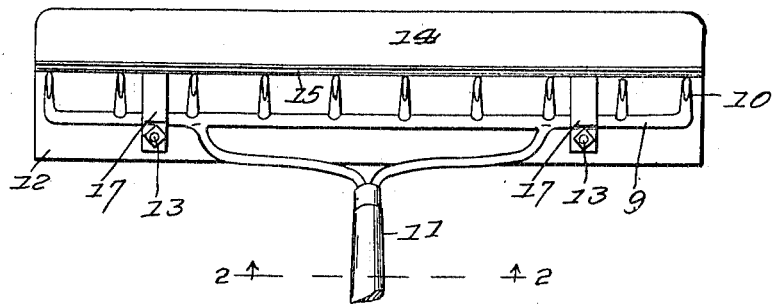
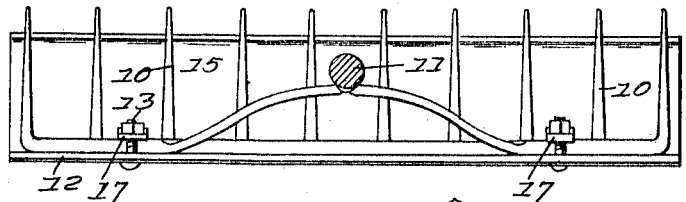
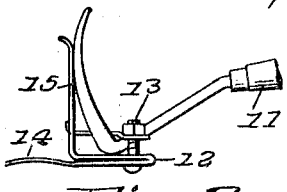 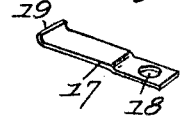 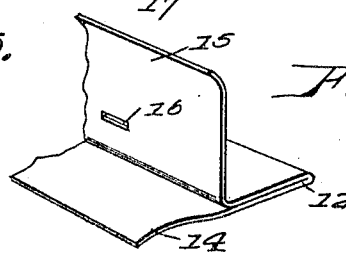
Inventor
Herman Milleman

UNITED STATES PATENT OFFICE.

HERMAN MILLEMAN, OF BOISE, IDAHO.

RAKE AND HOE.

1,105,815.  Specification of Letters Patent.  Patented Aug. 4, 1914.

Application filed August 25, 1913. Serial No. 786,510.

*To all whom it may concern:*

Be it known that I, HERMAN MILLEMAN, a citizen of the United States of America, and resident of Boise, in the county of Ada and State of Idaho, have invented certain new and useful Improvements in Rakes and Hoes, of which the following is a specification.

This invention relates to implements or attachments to implements in which provision is made for leveling loose soil, cutting weeds or forming a scraper for earth or snow, the invention further contemplating the provision of means for producing a rake, with a stop back of or above the upper portion of the tangs, for collecting grass clippings, dead grass, leaves, &c., and preventing injury to grass roots when in use as a lawn rake, combined with a leveler, weeder and scraper.

An object of this invention is to provide a device which may be attached to a rake or which may be utilized as a substitute for a rake whereby there is produced a combination tool of comparatively inexpensive construction and of great utility.

With the foregoing and other objects in view, the invention consists in the details of construction and in the arrangement and combination of parts to be hereinafter more fully set forth and claimed.

In describing the invention in detail, reference will be had to the accompanying drawings forming parts of this specification wherein like characters denote corresponding parts in the several views, and in which—

Figure 1 illustrates an underneath plan view of a rake with a device embodying one form of the invention applied thereto; Fig. 2 illustrates a sectional view on the line 2—2 of Fig. 1; Fig. 3 illustrates an end elevation; Fig. 4 illustrates a perspective view of a fragment of the device for attaching to a rake; Fig. 5 illustrates a perspective view of a clip for securing the attachment to a rake.

In these drawings 9 denotes the head of a rake, 10 the tangs thereof and 11 a handle, which parts may be of any ordinary construction.

The combined cutter and scraper utilized in connection with the rake comprises a plate doubled on itself to form the head 12 which overlies the head of the rake and being supplied with apertures for the bolts 13 by which the attachment is clamped to the head of the rake. As shown in the drawing, the attachment has diverging blade sections 14 and 15, the former of which extends forwardly at approximately right angles to the tangs of the rake, whereas the latter blade section 15 extends approximately parallel with the tangs and engages the outer surfaces thereof. The blade section 15 has slots 16 therein for the reception of the end of the clip 17, each of said clips having an aperture 18 through which the bolt 13 extends. As shown in the drawing, the clip 17 has a curved shoulder 19 adapted to extend through the aperture 16 and engage the outer wall of the blade 15 so that when the bolt is in position to clamp the clip in engagement with the head of the rake, the fulcrum of the clip on the head of the rake forces the shoulder 19 in engagement with the outer surface of the blade and aids in retaining the same in place.

As stated heretofore, the blade 14 which stands at approximately right angles to the tangs of the rake may be utilized as a weeder or a cutting implement and the blade 15 may likewise be utilized to convert the rake into a hoe or an implement resembling a hoe and designed to accomplish all of the functions of such an implement, that is to say, it may be used for digging or scraping or any other like function.

I claim—

In combination with a rake head, a hoe comprising a metal plate folded upon itself to form a head, said plate extending at right angles with relation to the head, said plate having openings, means for securing the hoe to the rake head, said means comprising clips, each of said clips having a shoulder, the said shoulders adapted to extend through the openings of the right angled plate, and means for clamping the opposite end of the clip to the hoe head.

In testimony whereof, I affix my signature in the presence of two witnesses.

HERMAN MILLEMAN.

Witnesses:
 CHAS. S. KINGSLEY,
 C. A. GROVES.